(12) United States Patent  
Wang

(10) Patent No.: US 9,050,991 B2  
(45) Date of Patent: Jun. 9, 2015

(54) STRAP ADJUSTER AND STROLLER BACKREST TILT ADJUSTING DEVICE

(71) Applicant: Er-Xue Wang, Hong Kong (CN)

(72) Inventor: Er-Xue Wang, Hong Kong (CN)

(73) Assignee: Wonderland Nurserygoods Company Limited, Hong Kong (HK)

( * ) Notice: Subject to any disclaimer, the term of this patent is extended or adjusted under 35 U.S.C. 154(b) by 295 days.

(21) Appl. No.: 13/662,230

(22) Filed: Oct. 26, 2012

(65) Prior Publication Data

US 2013/0106160 A1     May 2, 2013

(30) Foreign Application Priority Data

Oct. 27, 2011   (CN) .......................... 2011 1 0331354

(51) Int. Cl.
| | |
|---|---|
| *B60N 2/22* | (2006.01) |
| *A44B 11/02* | (2006.01) |
| *B62B 9/10* | (2006.01) |
| *A44B 11/12* | (2006.01) |
| *B65D 63/16* | (2006.01) |

(52) U.S. Cl.
CPC ............. *B62B 9/104* (2013.01); *Y10T 24/2194* (2015.01); *Y10T 24/4016* (2015.01); *Y10T 24/4021* (2015.01); *Y10T 24/407* (2015.01); *A44B 11/12* (2013.01); *B65D 63/16* (2013.01)

(58) Field of Classification Search
CPC ........ B62B 9/104; A44B 11/02; A44B 11/06; A44B 11/16; Y10T 24/2194; Y10T 24/4016; Y10T 24/4021; Y10T 24/407
USPC .................. 24/170, 172, 191; 297/354.12
See application file for complete search history.

(56) References Cited

U.S. PATENT DOCUMENTS

| | | | | |
|---|---|---|---|---|
| 5,007,141 | A * | 4/1991 | Gentes .................... | 24/163 R |
| 5,666,700 | A * | 9/1997 | Anscher et al. .......... | 24/168 |
| 6,108,875 | A * | 8/2000 | Anscher ................... | 24/170 |
| 7,284,797 | B2 * | 10/2007 | Huang ..................... | 297/354.12 |
| 2003/0052474 | A1 * | 3/2003 | Yang et al. ............... | 280/642 |

* cited by examiner

*Primary Examiner* — Robert J Sandy
(74) *Attorney, Agent, or Firm* — Holland & Hart LLP

(57) ABSTRACT

A strap adjuster is adapted for use with a strap, and includes a housing permitting passage of the strap therethrough, a strap-guiding member disposed in the housing, and a locking member disposed in the housing and cooperating with the housing to define a locking area therebetween. The housing permits the strap to enter therein in an entry direction. The strap-guiding member guides the strap to change from extending in the entry direction to extending in an exit direction. The locking area permits the strap extending in the exit direction to pass therethrough. The locking member is operable for restricting movement of the strap, and the housing further permits the strap passing through the locking area to exit therefrom.

9 Claims, 3 Drawing Sheets

STRAP ADJUSTER AND STROLLER BACKREST TILT ADJUSTING DEVICE

CROSS-REFERENCE TO RELATED APPLICATION

This application claims priority of Chinese Application No. 201110331354.0, filed on Oct. 27, 2011.

BACKGROUND OF THE INVENTION

1. Field of the Invention

The present invention relates to a strap adjuster, more particularly to a strap adjuster adapted for a stroller backrest tilt adjusting device.

2. Description of the Related Art

A strap adjuster has been widely adopted in clothing, a bag, a case, a vehicle seat, a stroller, sporting equipment, etc. The strap adjuster is primarily utilized for restricting movement of a strap so as to fasten an object which is held or wrapped by the strap, and to provide stability and safety. The strap adjuster may be operated by hand for achieving effects of restricting movement of the strap and releasing movement restriction on the strap.

A stroller is a common and convenient means for baby care. Since the stroller is designed for carrying infants, safety requirements for an infant being carried by the stroller are usually a major concern when designing the stroller. Therefore, relevant authorities have made regulations and safety standards for strollers so as to ensure safety of infants. Further, as strollers become more popular, expanding functionalities of strollers has gained more attention. For example, aside from safety, comfort of the infant carried by the stroller, and convenience in using the stroller are desired as well.

For promoting comfort of an infant carried by the stroller, tilt of a backrest of the stroller is designed to be adjustable. For example, a stroller backrest tilt adjusting device disclosed in U.S. Patent Application Publication No. 2006/0001241 includes two supporting straps for supporting the backrest of the stroller, a strap direction guiding unit, and an adjusting assembly fixed to an upper portion of the backrest. Each supporting strap has a fixed end attached to a frame of the stroller and a free end. The strap direction guiding unit allows the free end of each of the supporting straps to pass therethrough and guides the straps' direction. The adjusting assembly is capable of exerting a locking force for adjusting the effective supporting length of the straps. However, even though an effect of stroller backrest tilt adjustment may be achieved in this publication, the stroller backrest tilt adjusting device has a relatively complex structure. Moreover, since the strap direction guiding unit is exposed, sections of the supporting straps which are guided thereby are also exposed, such that service life of the supporting straps may be undesirably shortened, and an exposed winding design may have a safety risk to the infant and the user. Furthermore, the strap direction guiding unit guides the supporting straps and the adjusting assembly adjusts the same separately, such that the stroller backrest tilt adjusting device has a complex appearance, a loose structure, and a relatively short service life.

SUMMARY OF THE INVENTION

Therefore, an object of the present invention is to provide a strap adjuster which has a compact structure, a simple appearance, and a relatively long service life.

Accordingly, the strap adjuster of the present invention is adapted for use with a strap. The strap adjuster comprises a housing configured to permit passage of the strap therethrough, a strap-guiding member disposed in the housing, and a locking member disposed in the housing and cooperating with the housing to define a locking area therebetween. The housing is configured to permit the strap to enter therein in an entry direction. The strap-guiding member is configured to guide the strap to change from extending in the entry direction to extending in an exit direction different from the entry direction. The locking area is configured to permit the strap extending in the exit direction to pass therethrough. The locking member is operable for restricting movement of the strap that passes through the locking area, and the housing is further configured to permit the strap passing through the locking area to exit therefrom.

Another object of the present invention is to provide a backrest tilt adjusting device of a stroller which has a compact structure, a simple appearance, and a relatively long service life.

Accordingly, the backrest tilt adjusting device of the stroller, according to the present invention, comprises a strap for supporting a backrest of the stroller and having a fixed end to be attached to a frame of the stroller, and a strap adjuster to be attached to the backrest of the stroller. The strap adjuster includes a housing configured to permit passage of the strap therethrough, a strap-guiding member disposed in the housing, and a locking member disposed in the housing and cooperating with the housing to define a locking area therebetween. The housing is configured to permit the strap to enter therein in an entry direction. The strap-guiding member is configured to guide the strap to change from extending in the entry direction to extending in an exit direction different from the entry direction. The locking area is configured to permit the strap extending in the exit direction to pass therethrough. The locking member is operable for restricting movement of the strap that passes through the locking area, and the housing is further configured to permit the strap passing through the locking area to exit therefrom.

An effect of the present invention resides in that, by means of disposing the strap-guiding member in the housing of the strap adjuster, the strap is guided to change an extending direction thereof, and a section of the strap which is guided by the strap-guiding member is covered by the housing of the strap adjuster so as to prevent outside interference and to promote service life while achieving a compact structure and a simple appearance at the same time. Moreover, the locking member is disposed in the housing and cooperates with the housing for restricting movement of the strap so as to achieve a better locking effect.

BRIEF DESCRIPTION OF THE DRAWINGS

Other features and advantages of the present invention will become apparent in the following detailed description of a preferred embodiment with reference to the accompanying drawings, of which.

DETAILED DESCRIPTION OF THE PREFERRED EMBODIMENT

Referring to FIG. 1 to FIG. 5, a preferred embodiment of a strap adjuster according to the present invention is illustrated. In this embodiment, the strap adjuster is to be disposed on a stroller, and is to be utilized in a backrest tilt adjusting device of a stroller for adjusting an angle at which a backrest of the stroller tilts. The backrest tilt adjusting device includes a strap 1 which is for supporting a backrest of the stroller and which has a fixed end (not shown) to be attached to a frame of the stroller, and a strap adjuster 2 which is to be attached to the backrest of the stroller. Of course, the strap adjuster 2 may also be adapted to other fields of application, and is not limited to the application in this preferred embodiment.

Figure 4:
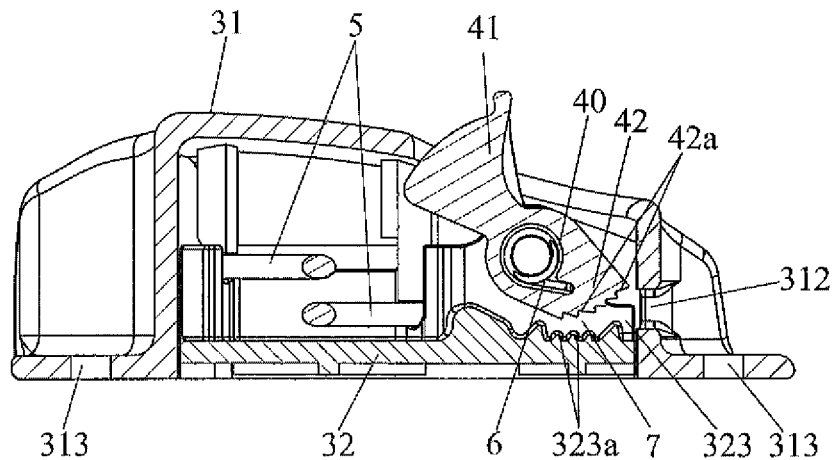
FIG. 4 is a sectional view illustrating a restricting position of a locking portion of the preferred embodiment.

The preferred embodiment of the strap adjuster 2 comprises a housing 3 configured to permit passage of the strap 1 therethrough, a strap-guiding member 5 disposed in the housing 3, and a locking member 4 disposed in the housing 3. Referring to FIG. 4, the locking member 4 cooperates with the housing 3 to define a locking area 7 therebetween. The housing 3 is configured to permit the strap 1 to enter therein in an entry direction. The strap-guiding member 5 is configured to guide the strap 1 to change from extending in the entry direction to extending in an exit direction different from the entry direction. The locking area 7 is configured to permit the strap 1 extending in the exit direction to pass therethrough. The locking member 4 is operable for restricting movement of the strap 1 that passes through the locking area 7, and the housing 3 is further configured to permit the strap 1 passing through the locking area 7 to exit therefrom.

In this embodiment, the backrest tilt adjusting device includes two of the straps 1, each of which has the fixed ends to be attached to the frame of the stroller. Preferably, the strap adjuster 2 comprises two of the strap-guiding members 5, and an extension plane of one of the strap-guiding members 5 is disposed to cross an extension plane of the other one of the strap-guiding members 5. However, the number of the strap-guiding members 5 should not be limited to the disclosure of this embodiment, and may be more than two in other embodiments of the invention. The housing 3 is configured to permit each of the two straps 1 to enter therein from two opposite and respective sides of the housing 3. Each of the strap-guiding members 5 is configured to guide a respective one of the straps 1 to change from extending in the entry direction to extending in the exit direction in a manner that the straps 1 pass through the locking area 7 in a stacked arrangement. It is noted that the entry dictions of the straps 1 are different, and are preferably opposite directions.

By this design, the strap adjuster 2 is able to implement direction guidance and movement restriction of the straps 1.

It is noted that, in this embodiment, the backrest tilt adjusting device includes two of the straps 1. However, only one strap 1 may also be adopted for achieving a similar effect. In practice, two ends of the single strap 1 are fixed to opposite sides of the frame of the stroller. The strap adjuster 2 permits a middle section of the strap 1 to pass therethrough, and the middle section of the strap 1 may be used as an operating end for adjusting tilt of the backrest.

Figure 1:
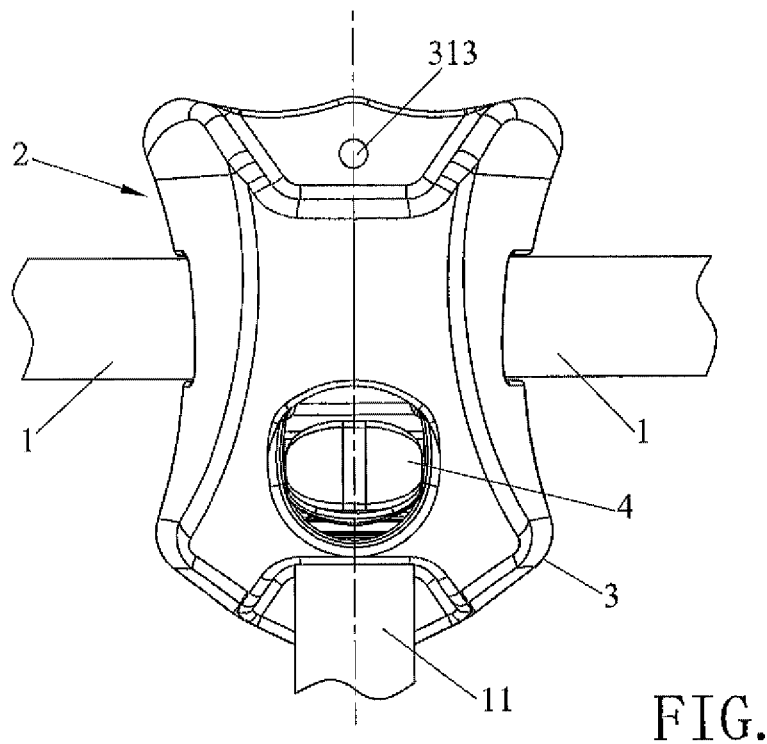
FIG. 1 is a schematic view of a preferred embodiment of a strap adjuster according to the present invention.
Figure 2:
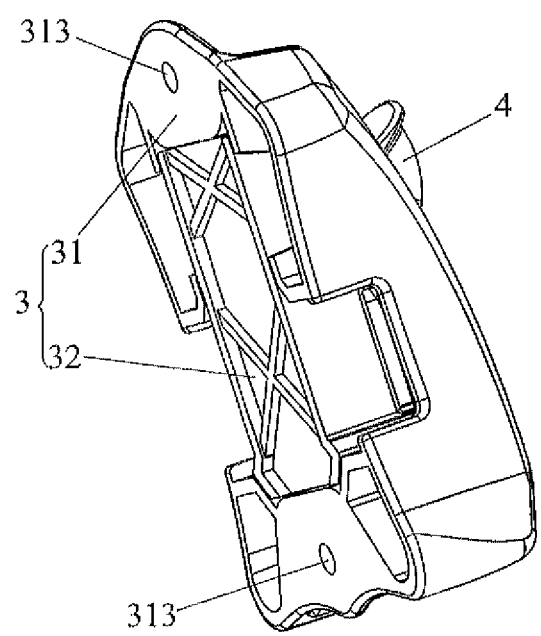
FIG. 2 is a perspective view of the preferred embodiment of the strap adjuster.

Preferably, referring from FIG. 2 to FIG. 5, the housing 3 includes a first cover 31 and a second cover combined with each other. The locking member 4 includes a locking portion 42 disposed at the second cover 32 and pivotable relative to the second cover 32, and an operating portion 41 that extends from the locking portion 42, that extends through the first cover 31 and that is accessible from outside the housing 3. The locking portion 42 and the second cover 32 define the locking area 7 therebetween. Preferably, the locking portion 42 of the locking member 4 and the second cover 32 are provided with a roughened structure that defines the locking area 7. As shown in FIG. 2, the first cover 31 is formed with fastening holes 313. In assembly, fasteners (not shown) may be used to attach the strap adjuster 2 to the backrest of the stroller. In this embodiment, the fasteners may be screws or rivets.

Figure 3:
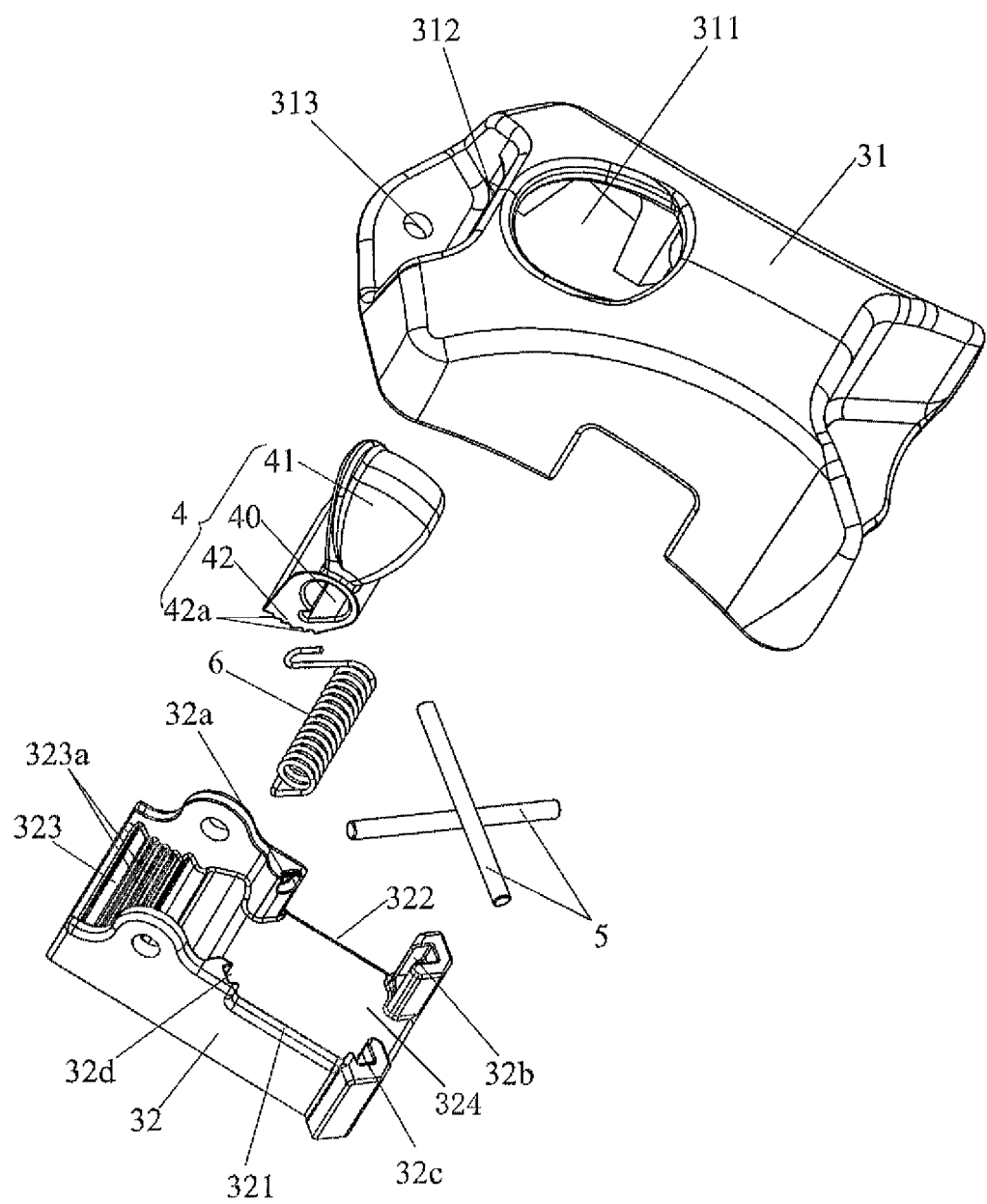
FIG. 3 is an exploded view of the preferred embodiment of the strap adjuster.

Referring to FIG. 3, the second cover 32 has two opposite lateral walls that extend perpendicularly from a base plate 324 of the second cover 32 and that are respectively provided with a first slot 321 and a second slot 322 for permitting passage of the two straps 1. Each of the two lateral walls is further provided with a respective set of first and second grooves 32a, 32b, and third and fourth grooves 32c, 32d for mounting the strap-guiding members 5 on the second cover 32. The second cover 32 further has one side that is located between the two lateral walls and that is provided with a third slot 323 for permitting passage of other ends (i.e., free ends 11) of the straps 1 distal from the fixed ends. The first groove 32a and the third groove 32c are at a first height level with respect to the base plate 324 of the second cover 32, and the second groove 32b and the fourth groove 32d are at a second height level lower than the first height level with respect to the base plate 324. The two strap-guiding members 5 are disposed at the second cover 32 in a manner that two opposite ends of each of the strap-guiding members 5 are inserted into a corresponding pair of the grooves (i.e., the first and third grooves 32a, 32c, or the second and fourth grooves 32b, 32d). Preferably, each of the strap-guiding members 5 forms a 45 degree angle with respect to a direction in which a respective one of the straps 1 enters the housing 3 (i.e., the entry direction). It is noted that the angle formed therebetween is not limited to 45 degrees, and may be otherwise in other embodiments of this invention. In this embodiment, the extension plane of one of the strap-guiding members 5 is disposed to cross the extension plane of the other one of the strap-guiding members 5 at a 90 degree angle.

By means of the strap-guiding members 5, the direction in which the straps 1 enter the housing 3 forms a 90 degree angle with respect to a direction in which the straps 1 exit the housing 3, i.e., the entry direction is perpendicular to the exit direction. The straps 1 are guided respectively by the strap-guiding members 5 and pass through the locking area 7 in a stacked arrangement, such that the free ends 11 of the straps 1 exit the housing 3 in a flattened manner and the backrest tilt adjusting device is able to have a compact structure. Moreover, each of the strap-guiding members 5 is an elongate rod with a substantially round cross-section for winding of a respective one of the straps 1 and for guiding the strap 1 to extend in the exit direction, so as to have a relatively good guiding effect and facilitate user operation.

Figure 5:
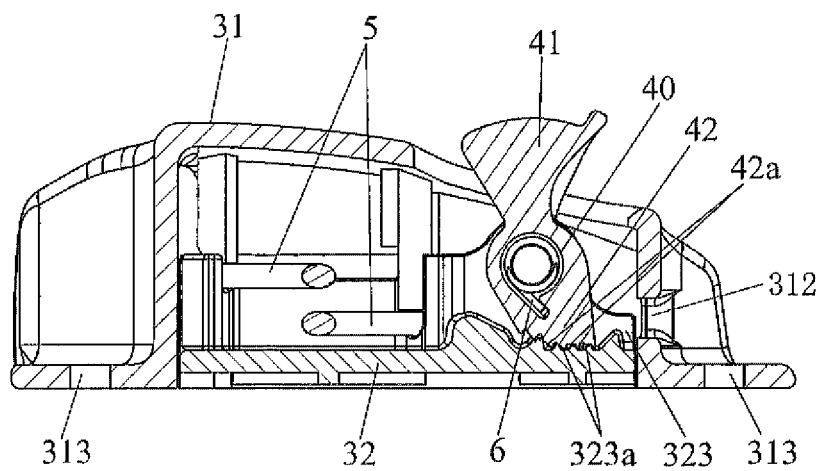
FIG. 5 is a sectional view illustrating a releasing position of the locking portion of the preferred embodiment.

Preferably, referring from FIG. 3 to FIG. 5, the strap adjuster 2 further comprises a torsion spring 6 that has one end connected to the locking member 4 and another end connected to the second cover 32. Preferably, the locking portion 42 is formed with a pivot slot 40, which is a substantially hollow cylinder in shape, for coupling to the second cover 32 and for receiving the torsion spring 6 therein. The one end of the torsion spring 6 is connected to the locking portion 42 at the pivot slot 40. The strap adjuster 2 further comprises a pivot shaft (not shown) which is received in the pivot slot 40 and extends through the torsion spring 6 for coupling to the two lateral walls of the second cover 32. The torsion spring 6 is configured for biasing the locking portion 42 to a restricting position for restricting movement of the strap 1 that passes through the locking area 7. In this embodiment, the locking portion 42 of the locking member 4 is disposed at the second cover 32, and is pivotable relative to the second cover 32 for restricting movement of the straps 1 or releasing movement restriction thereon. However, the locking member 4 should not be limited to the disclosure herein, and may be implemented using other locking schemes, such as a locking structure with parallel movement or vertical movement.

In this embodiment, the first cover 31 is formed with an operating hole 311 and an outlet hole 312 for permitting the straps 1 to exit the housing 3 through the outlet hole 312. The operating portion 41 of the locking member 4 extends through the first cover 31 via the operating hole 311. The operating portion 41 is accessible from outside the housing 3 for enabling application of an external force to the operating portion 41 such that the locking member 4 is actuated to pivot the locking portion 42 to a releasing position for releasing movement restriction on the straps 1. Specifically, the outlet hole 312 corresponds in position to the locking area 7 and is aligned with the third slot 323 of the second cover 32. The locking portion 42 of the locking member 4 is formed with first teeth 42a that face the second cover 32. The second cover 32 is formed with second teeth 323a, which correspond to the first teeth 42a, on a portion of the base plate 324 adjacent to the third slot 323. In this way, the straps 1 passing through the locking area 7 are locked by the first teeth 42a and the second teeth 323a such that movement of the straps 1 may be restricted thereby. Preferably, the first and second teeth 42a, 323a are arranged to incline in a same direction. By this design, the straps 1 may be moved smoothly when adjusting tilt of the backrest of the stroller.

Detailed operation procedures of the preferred embodiment of the strap adjuster are illustrated hereinafter. When intending to adjusting tilt of the backrest, a user may apply force on the operating portion 41 of the locking member 4, such that the locking portion 42 of the locking member 4 pivots with respect to the second cover 32 to the releasing position, in which the first teeth 42a of the locking portion 42 are moved away from the second teeth 323a of the second cover 32, so as to release movement restriction on the straps 1. At this time, sections of the straps 1 for holding the backrest may be adjusted for implementing backrest tilt adjustment. After adjusting the backrest to the desired tilt, the user may release the operating portion 41. Due to a restoring force of the torsion spring 6, the locking portion 42 is biased by the torsion spring 6 to the restricting position, and the first teeth 42a of the locking portion 42 cooperate with the second teeth 323a of the second cover 32 to lock sections of the straps 1 which pass through the locking area 7, so as to restrict movement of the straps 1. In this way, tilt of the backrest may be adjusted to a desired angle, and the whole operation procedures may be performed with relative ease and convenience.

To sum up, by means of disposing the strap-guiding members 5 in the housing 3 of the strap adjuster 2, the strap-guiding members 5 enable direction changing of the straps 1 in the strap adjuster 2, and the sections of the straps 1 which are guided by the strap-guiding members 5 are covered by the housing 3 so as to prevent outside interference and to promote service life of the backrest tilt adjusting device. Meanwhile, the first teeth 42a of the locking portion 42 cooperate with the second teeth 323a of the second cover 32 to lock the straps 1 which pass through the locking area 7, so as to provide a relatively good locking effect.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A strap adjuster for use with a strap, said strap adjuster comprising:
    a housing configured to permit passage of the strap therethrough;
    two strap-guiding members disposed in said housing; and
    a locking member disposed in said housing and cooperating with said housing to define a locking area therebetween;
    wherein said housing is configured to permit two sections of the strap to enter therein in an entry direction from two opposite sides of said housing, each of said strap-guiding member is configured to guide a respective one of the sections of the strap to change from extending in the entry direction to extending in an exit direction different from the entry direction in a manner that the sections of the strap pass through said locking area in a stacked arrangement, said locking area is configured to permit the strap extending in the exit direction to pass therethrough, said locking member is operable for restricting movement of the strap that passes through said locking area, and said housing is further configured to permit the strap passing through said locking area to exit therefrom; and
    wherein an extension plane of one of said strap-guiding members is disposed to cross an extension plane of the other one of said strap-guiding members.

2. The strap adjuster as claimed in claim 1, wherein each of said strap-guiding members forms a 45 degree angle with respect to the entry direction.

3. A strap adjuster for use with a strap, said strap adjuster comprising;
    a housing configured to permit passage of the strap therethrough;
    a strap-guiding member disposed in said housing; and
    a locking member disposed in said housing and cooperating with said housing to define a locking area therebetween;
    wherein said housing is configured to permit the strap to enter therein in an entry direction, said strap-guiding member is configured to guide the strap to change from extending in the entry direction to extending in an exit direction different from the entry direction, said locking area is configured to permit the strap extending in the exit direction to pass there through, said locking member is operable for restricting movement of the strap that passes through said locking area, and said housing is further configured to permit the strap passing through said locking area to exit therefrom; and
    wherein said housing includes a first cover and a second cover combined with each other, said locking member including a locking portion disposed at said second cover and pivotable relative to said second cover, and an operating portion that extends from said locking portion, that extends through said first cover and that is accessible from outside said housing, said locking portion and said second cover defining said locking area therebetween.

4. The strap adjuster as claimed in claim 3, further comprising a torsion spring that has one end connected to said locking member and another end connected to said second cover for biasing said locking portion to a restricting position for restricting movement of the strap that passes through said locking area.

5. The strap adjuster as claimed in claim 4, wherein said locking portion is formed with a pivot slot, which is a substantially hollow cylinder in shape, four coupling to said second cover and for receiving said torsion spring therein, said one end of said torsion spring being connected to said locking portion at said pivot slot.

6. The strap adjuster as claimed in claim 3, wherein said locking portion of said locking member and said second cover are provided with a roughened structure that defines said locking area.

7. The strap adjuster as claimed in claim 3, wherein said locking portion of said locking member is formed with first teeth that face said second cover, sand said second cover is formed with second teeth that correspond to said first teeth.

8. The strap adjuster as claimed in claim 7, wherein said first and second teeth are arranged to incline in a same direction.

9. A strap adjuster for use with a strap, said strap adjuster comprising;
   a housing configured to permit passage of the strap therethrough;
   a strap-guiding member disposed in said housing; and a locking member disposed in said housing and cooperating with said housing to define a locking area therebetween;
   wherein said housing is configured to permit the strap to enter therein in an entry direction, said strap-guiding member is configured to guide the strap to change from extending in the entry direction to extending in an exit direction different from the entry direction, said locking area is configured to permit the strap extending in the exit direction to pass therethrough; said locking member is operable for restricting movement of the strap that passes through said locking area, and said housing is further configured to permit the strap passing through said locking area to exit therefrom; and
   wherein said strap-guiding member is an elongate rod with a substantially round cross-section for winding of the strap and for guiding the strap to the exit direction.

* * * * *